(No Model.)
J. D. ROBERTSON.
TWO WHEELED VEHICLE.
No. 297,451. Patented Apr. 22, 1884.
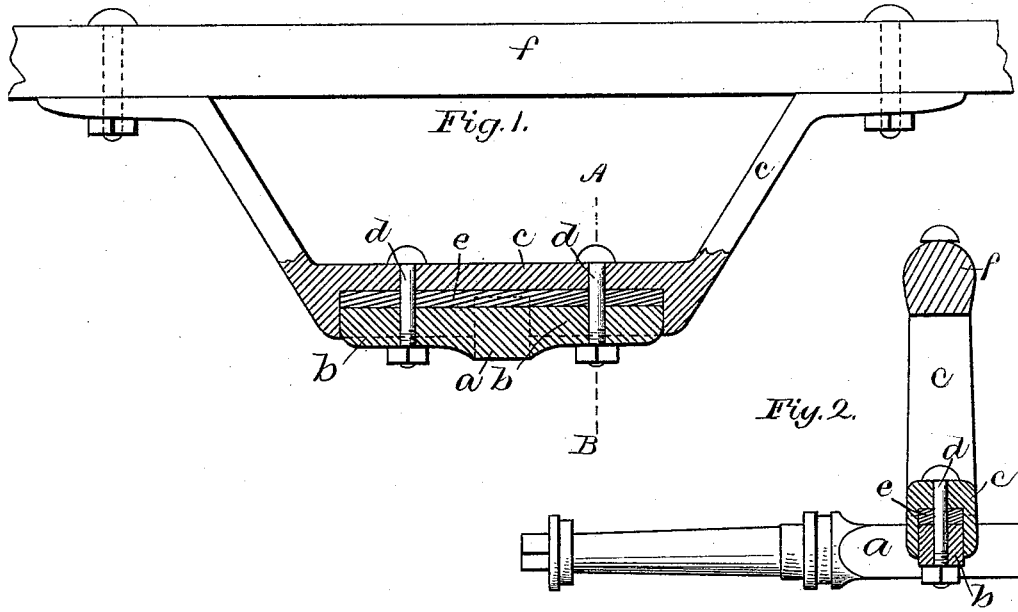
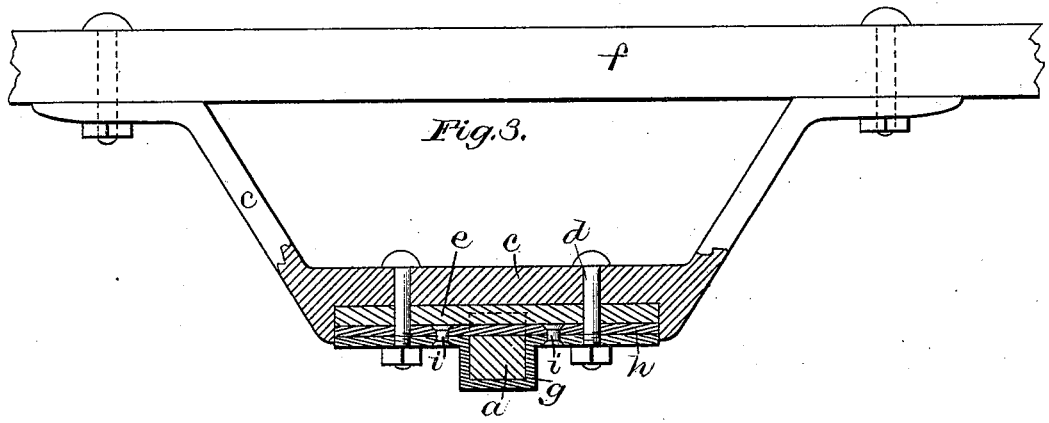
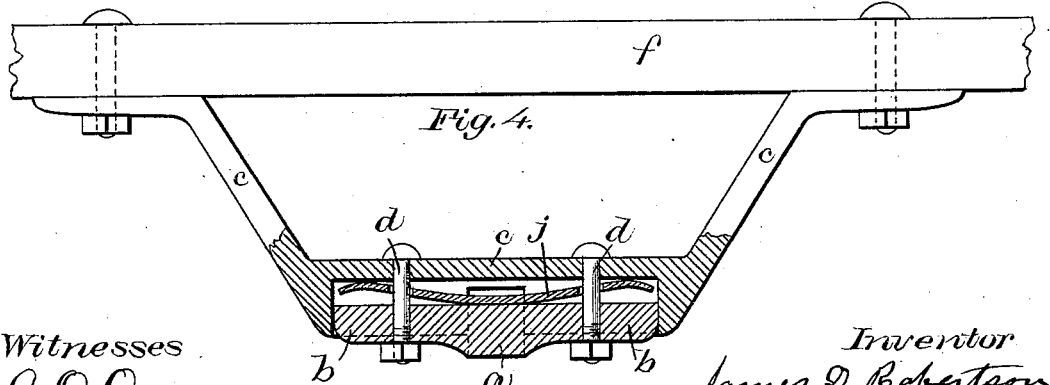
Witnesses
A. O. Orne
H. P. Bailey
Inventor
James D. Robertson
per Porter & Hutchinson
Attys

UNITED STATES PATENT OFFICE.

JAMES D. ROBERTSON, OF SALISBURY, MASSACHUSETTS.

TWO-WHEELED VEHICLE.

SPECIFICATION forming part of Letters Patent No. 297,451, dated April 22, 1884.

Application filed December 17, 1883. (No model.)

*To all whom it may concern:*

Be it known that I, JAMES D. ROBERTSON, of Salisbury, in the county of Essex and State of Massachusetts, have invented a new and useful Improvement in Shaft and Axle Connections for Two-Wheeled Vehicles, which will, in connection with the accompanying drawings, be hereinafter fully described, and specifically defined in the appended claims.

This invention has for its object a cushioned connection between the shafts and axle of two-wheeled vehicles; and the invention consists in the construction and combination of the divers devices embodied therein, as will be hereinafter more particularly described, and defined in the appended claims.

In the accompanying drawings, Figure 1 is a sectional elevation, in which the axle is shown in transverse section. A portion of the shaft is shown in side elevation, and the connecting-saddle is in its upper portion shown in elevation and in its lower portion in longitudinal vertical section, the axle-lugs and the elastic packing being each shown in similar elevation. Fig. 2 is a sectional elevation, the section being taken as on line A B, Fig. 1, and the elevation as viewed from the right in that figure, but with the axle intact. Fig. 3 is a view similar to Fig. 1, but showing a modification of the axle and lugs. Fig. 4 is also a view like Fig. 1, but showing a curved metallic spring substituted for the elastic packing.

In said views, $a$ is the axle, which in Figs. 1, 2, 4 is shown as having the lugs $b$ formed integrally therewith in a well-known manner. A sheet of elastic packing, $e$—preferably india-rubber—is seated upon lugs $b$, as shown in Figs. 1, 2, 3, said packing being inclosed in and secured in position in a longitudinal cavity in the enlarged central portion of saddle $c$, which is formed to receive both said packing and lugs, the axle fitting in a recess in the side walls of said cavity. Said saddle is secured in place by bolts $d$, which pass through the upper wall of the saddle, and through packing $e$ and lugs $b$, as shown, the saddle at its extremities being formed to be secured to shaft $f$, as shown, and in a well-known manner.

Instead of forming lugs $b$ as an integral part of the axle, my invention is equally adapted to be employed with the substitute for said solid lugs, shown in Fig. 3, where a clamp, $g$, and top plate, $h$, secured together by rivets $i$, embrace the axle and receive the packing $e$ and saddle $c$, as shown.

Instead of a sheet of rubber, a curved steel spring, $j$, may be employed; but for cheapness, durability, and muffling of the noise of the wheels I much prefer such sheet packing.

I am well aware that it is old, common, and well known to employ a metallic saddle with an interposed elastic cushion as the means of connection between the shaft and axle, and hence I make no claim thereto as ordinarily constructed. By means of the yielding packing and its adaptability to equalize the pressure upon the securing-bolts $d$, and by slacking each of said bolts upon one side of the axle and turning up the nuts on the bolts upon the opposite side of the axle, a variation of several inches in the height of the shafts at the harness-lugs may be produced without disturbing the level of the axle itself.

I claim as my invention—

1. The saddle $c$, formed with a central longitudinal cavity to receive the axle-lugs and elastic buffer, and having a transverse seat in the side walls of said cavity for the axle, and with the elevated ends formed to be secured to shaft $f$, substantially as specified.

2. The combination, with saddle $c$, formed as specified, of axle $a$, formed or provided with securing-lugs adapted to enter the chamber in said saddle, a cushioning body interposed between said lugs and the roof of said chamber, and screw-bolts $d$ $d$, extending through the upper wall of said chamber, the cushioning body, and lugs, whereby the angle of the shafts relatively to the upper plane of the axle may be changed at will by actuating the screw-nuts on said bolts, substantially as specified.

JAMES D. ROBERTSON.

Witnesses:
ARIEL S. NOYES,
BLISS BOULTENHOUSE.